Figure 1:
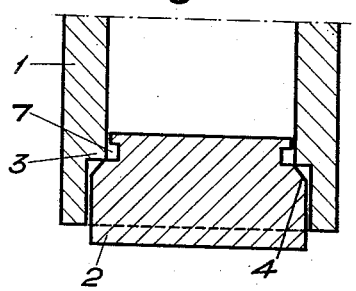

July 4, 1944.  B. ANDERSON ET AL  2,352,754
METHOD OF JOINING WORK PIECES BY MEANS OF RESISTANCE WELDING
Filed May 31, 1941  2 Sheets-Sheet 1

Inventors
Bror Anderson and Hans Wängsjö
By Wm Wallace White Attorney.

July 4, 1944.     B. ANDERSON ET AL     2,352,754
METHOD OF JOINING WORK PIECES BY MEANS OF RESISTANCE WELDING
Filed May 31, 1941     2 Sheets-Sheet 2

Inventors
Bror Anderson and Hans Wängsjö
By Wm Wallace White Attorney.

Patented July 4, 1944

2,352,754

UNITED STATES PATENT OFFICE 2,352,754

METHOD OF JOINING WORKPIECES BY MEANS OF RESISTANCE WELDING

Bror Anderson, Saltsjo-Duvnas, and Hans Wängsjö, Stockholm, Sweden, assignors to Aktiebolaget Asea Svetsmaskiner, Stockholm, Sweden, a corporation of Sweden Application May 31, 1941, Serial No. 396,204
In Sweden June 29, 1940

11 Claims. (Cl. 219—10)

In joining work pieces by means of resistance welding, the work pieces are pressed against each other with a certain pressure, while by a heavy electric current the contact surfaces between the work pieces are melted, the work pieces thus being welded together. If the contact surfaces between the pieces are large, very high currents are necessary in order to achieve a melting, and if one piece is large and the other is small it is very difficult to get an equal heating of the contact surfaces of the two pieces due to the larger heat capacity of the larger work piece with a correspondingly greater dissipating of the heat from the contact surface.

These two disadvantages are avoided by the projection welding, which means that one or both work pieces are provided with projections or rims so that especially during the first part of the welding time the contact surface is considerably reduced and thus also the current necessary for the melting. The dissipating of the heat from the contact surface of large work pieces is thus also considerably reduced.

The provision of such projections or rims means, however, a special operation by pressing or cutting tools.

The present invention has for its object a welding method, which is characterized in that the work pieces from the beginning are given such a form that at the commencement of the welding the contact between the work pieces takes place along a line, but is further characterized in that a space is formed between the work pieces, into which the material melted or softened by heating is pressed.

According to the invention, this space is so formed that the material pressed into it forms a mechanical connection between the work pieces. This space has the form of a groove in one of the pieces.

The invention is especially suitable for joining bottoms to work pieces in pipe form or for joining work pieces in the form of pipes. The invention is of course also applicable in such cases where the work pieces are not directly brought in connection with each other, but a wire or the like is inserted between them and it is of course also applicable to the joining of three work pieces by welding. By the invention it is made possible to join work pieces by welding, so that the melted material forced out is covered, whereby all finishing work is rendered unnecessary. Another considerable advantage of the invention is that the work pieces can be given a determined end position in relation to each other since the work pieces are provided with surfaces which determine the position of the work pieces in relation to each other at the end of the welding.

The invention makes it also possible to give the work pieces such a form that a proper position or centering is achieved without the use of special fixtures.

A number of different applications of the invention are shown on the accompanying drawings, the parts of the joints being shown in cross-section in the various views in which—

Figure 2:
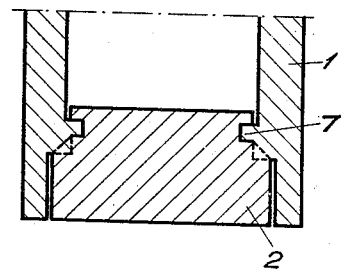
Figure 3:
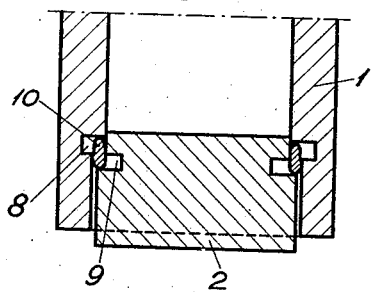
Figure 4:
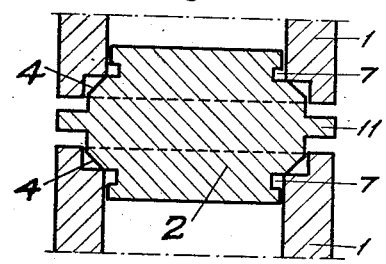
Figure 5:
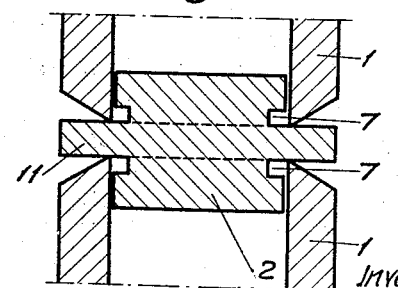
Figure 6:
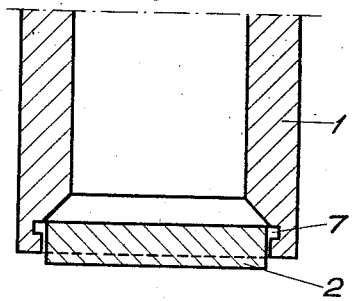
Figure 7:
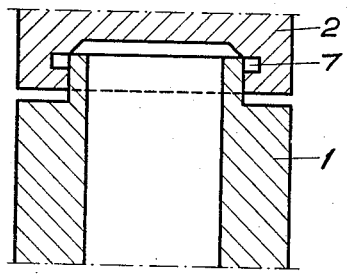
Figure 8:
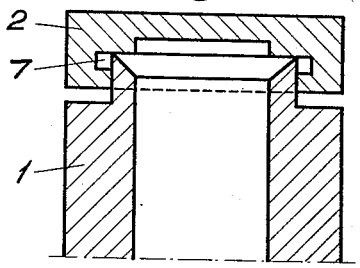
Figure 9:
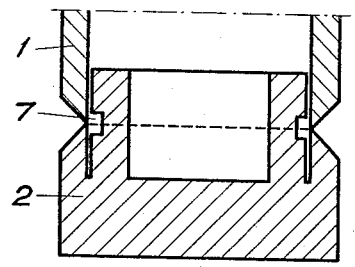
Figure 10:
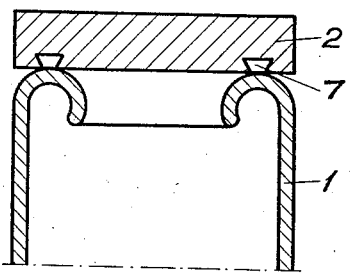
Figure 11:
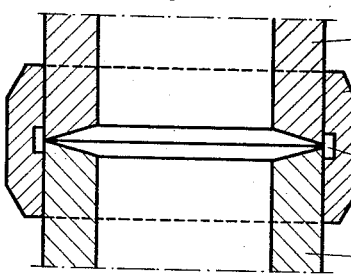
Figure 12:
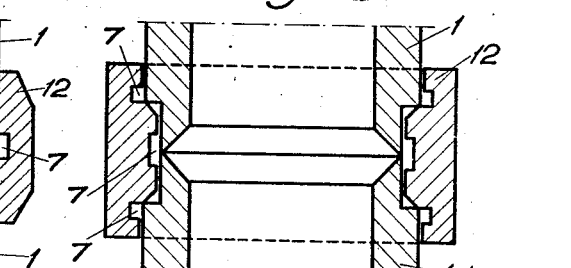

Fig. 1 shows a pipe and bottom member with the parts in position for welding and Fig. 2 shows the same parts after the welding of the joint; the remaining figures all show different forms of joints with the parts in position ready for welding; Fig. 3 shows another form of pipe and bottom member; Fig. 4 shows the parts for the welding of two pipes to an intermediate member; Fig. 5 is a similar view showing another form; Fig. 6 shows another form of pipe and bottom member; Fig. 7 shows a modified form of joint for a pipe and end member; Fig. 8 shows another form of the same; Fig. 9 shows a different form of pipe and bottom member; Fig. 10 shows another form of pipe and end member; Fig. 11 shows a form of joint applied to two pipe ends with a connecting member and Fig. 12 is a similar view showing a modified form.

Referring to the drawings:

On the accompanying drawings Figs. 1 and 2 show the application of the invention to the welding of a bottom member to a work piece in the form of a pipe and Fig. 1 shows the work pieces in their position at the beginning of the welding while Fig. 2 shows their form and position after welding is completed. 1 designates the pipe formed work piece and 2 the bottom. The pipe is from the beginning turned out at one end, so that a surface 3 forms a ledge, and the bottom 2 is provided with a bevelled edge or shoulder 4, which is in contact with the inner edge of the surface 3. The upper cylindrical part of the bottom 2 has a diameter a little smaller than the inner diameter of the pipe. This cylindrical part has for its object to prevent melted material from reaching the space above the bottom and thus to cover the material pressed out from the welding joint. In the arrangement shown, the two work pieces are joined both by a welding joint and a purely mechanical joint. The bottom 2 is also provided with a groove 7, which when the work pieces are pressed together is filled with melted or softened material. Fig. 2 shows the completed joint.

Fig. 3 also shows the application of the invention of the joining of a pipe with a bottom, but here both pipe and bottom are provided with grooves 8 and 9, and between the work pieces is a ring 10 of the same material as the work pieces or a material with a lower melting point. When heated the ring 10 is pressed out into the grooves 8 and 9, so that a very strong and tight joint is obtained.

Fig. 4 shows a method of joining two pipes or work pieces with an intermediary piece inserted between them, for instance an intermediary wall. The two pipes are designated by 1 and the intermediary wall by 2. This is, in the same manner as the bottom in Fig. 1 provided with two grooves 7 but has also a flange 11, which projects out between the pipes. When welding the pipes are pressed together until their end surfaces are brought into contact with the flange 11. Also in this case thus a limitation of the pressing motion is achieved, so that an exact relative end position of the work pieces is ensured.

Fig. 5 shows a modification of the arrangement according to Fig. 4. In this figure, the ends of the pipes are bevelled and rest against the flange 11 of the intermediary wall and the grooves 7 taking up the material pressed out are arranged in the intermediary wall close to the flange 11.

Fig. 6 shows a method of welding a bottom 2 to a pipe 1, but in the arrangement according to this figure, the groove 7 is arranged in the end of the pipe, whereas the bottom 2 consists merely of a cylindrical disk. In this arrangement the joint between the work pieces consists of a welding joint and a purely mechanical joint.

Figs. 7 and 8 show forms concerning welding of bottoms or end members to pipes, in which the bottom is provided with an annular formed part surrounding the end of the pipe, and in this annular formed part the groove for the melted material is provided.

It is also possible to proceed, as shown in Figs. 9 and 10, which figures represent two manners, which are especially suitable in joining a pipe with comparatively thin wall with a very thick bottom. The bottom 2 is in Fig. 10 provided with a fishtail formed groove 7, which at the welding is filled with the material forced out from the welding joint. The joint will thus be both a welding joint and a purely mechanical joint.

In order to get a sure centering of the pipes, the joint may be surrounded by a sleeve 12, which on the inner side is provided with one or two or a plurality of grooves 7 for the melted material forced out from the joint. The ends of the pipes may either be bevelled as shown in Fig. 11 or may be provided with inside flat turnings, as shown in Fig. 12, or may be provided with both.

In spite of the fact that the invention is shown applied on cylindrical work pieces it is of course also applicable on work pieces of any other form. The chief characteristic of the invention is that the work pieces are formed so that a space is formed between them, into which the material forced out from the joint when welding can escape so that the welding joint may not be visible or so that also a mechanical joint besides the welding joint is formed.

We claim as our invention:

1. The method of joining a tubular metal workpiece to another workpiece, which comprises forming on said other workpiece a cylindrical projection slightly less in diameter than the inner diameter of said tubular workpiece and a body portion of slightly greater diameter so as to form a shoulder therebetween, forming an annular groove in said projection adjacent said shoulder, forming a cylindrical recess in the end of said tubular workpiece slightly greater in diameter than said body portion, thus to provide a ledge at the inner end of said cylindrical recess, inserting said other workpiece into said tubular metal workpiece so as to press said shoulder against said ledge, and passing a welding current through the shoulder and ledge whereby to flow the metal forming said ledge into said groove.

2. The method of joining two metal workpieces together by electric welding which comprises forming first and second surfaces on one workpiece, the surfaces being spaced stepwise and having a perpendicular ledge connecting them, forming a third surface on the other workpiece adapted to lie opposite the second surface, providing an inwardly directed shoulder on the second workpiece at the end of said third surface, said shoulder lying at an obtuse angle to said surface, the inner end of said surface engaging said ledge when said third surface is slid relative to the second, forming a groove in said second workpiece along the inner edge of said shoulder, the groove being perpendicular to said first and second surfaces, and passing a welding current through the metal forming said shoulder and ledge while applying a force tending to slide said workpieces relative to one another so as to press said shoulder and ledge together whereby to flow the metal forming said shoulder into said groove.

3. The method of joining two metal workpieces together by electric welding which comprises forming first and second surfaces on one workpieces, the surfaces in cross-section, being spaced stepwise and having a perpendicular ledge connecting them, forming a third surface on the workpiece adapted to lie opposite the second surface, providing an inwardly bevelled shoulder on the second workpiece at the end of said surface adapted to engage said ledge when said third surface is slid relative to the second, forming a groove parallel to the ledge in said second workpiece along the inner edge of said shoulder, and passing a welding current through the metal forming said shoulder and ledge while applying a force tending to slide said workpieces relative to one another so as to press said shoulder and ledge together whereby to flow the metal forming said shoulder into said groove.

4. For use in electric welding a pair of generally complementary metal work pieces each having a pair of surfaces spaced stepwise with a ledge therebetween, one of said work pieces having a groove therein adjacent one edge of the ledge for receiving metal connected to the other work piece when said surfaces are slid relative to one another so as to press said ledges tightly together during welding, the surfaces being substantially parallel, the ledge on the work piece having a groove being bevelled, the other ledge being perpendicular to said surfaces.

5. For use in electric welding, a first metal workpiece having a cylindrical inner surface at one end thereof and annular, inwardly directed, perpendicular ledge at the inner end of said surface, a second metal workpiece having a cylindrical outer surface spaced from a free end thereof substantially complementary with the inner surface of said first workpiece, an annular shoulder beveled inwardly from said surface towards said free end, the inner diameter of said shoulder being substantially equal to the inner diameter of said ledge, said second workpiece having an annular groove between the inner end of said shoulder and said free end for receiving the metal from said ledge when said workpieces are telescoped together and a welding current is passed therebetween.

6. For use in electric welding, a first metal workpiece having a first cylindrical wall portion adjacent an end thereof, a second cylindrical wall portion substantially coaxial with the first but of different diameter and being set back from said end, and a substantially perpendicular ledge between said portions, said ledge facing said end and forming a corner at its junction with said second wall portion, a second metal workpiece having first and second wall portions substantially complementary with those on the first workpiece, respectively, and having a ledge therebetween inclined with respect to the first-mentioned ledge, said second workpiece having an annular groove therein adjacent the end of said inclined ledge which lies adjacent said corner when said workpieces are fitted together, whereby to receive the corner metal when said workpieces are pressed together and a welding current is passed therebetween.

7. For use in electric welding, a pair of cylindrical metal workpieces each having a first cylindrical wall portion adjacent the end thereof and a second cylindrical wall portion substantially coaxial with the first but of different diameter and being set back from said end, and a ledge between said portions, said ledge facing said end and forming a corner at its junction with the second wall portion, and a third metal workpiece for connecting the first two workpieces, said third workpiece having two end portions, each of the last-mentioned end portions having wall portions substantially complementary with those on the first two workpieces, respectively, and having a ledge therebetween inclined with respect to said walls, each of the end portions of said third workpiece having an annular groove therein at the end of the inclined ledge which lies adjacent the corner of one of the first two workpieces when the third workpiece is fitted between the first two workpieces, whereby to receive the metal forming said corners when the workpieces are pressed together and a welding current is passed therebetween.

8. The combination claimed in claim 7, the first and second workpieces comprising pipes, the first and second surfaces thereon being inner surfaces, the third workpiece comprising a plug with the first and second surfaces on each end portion thereof being outer surfaces.

9. The combination claimed in claim 7, the first and second workpieces comprising pipes, the first and second surfaces thereon comprising inner surfaces, the third workpiece comprising a plug with the surfaces at each end thereof being outer surfaces, said plug having a portion intermediate the end portions thereon of greater diameter than said end portions and forming oppositely facing ledges whereby to engage the ends of the first and second workpieces upon predetermined movement thereof together.

10. The combination claimed in claim 7, the first and second workpieces comprising pipes with the first and second surfaces thereon being outer surfaces, the third workpiece comprising a sleeve with the surface on each end portion thereof being an inner surface.

11. The combination claimed in claim 7, the first and second workpieces comprising pipes with the first and second surfaces thereon being outer surfaces, at least one end of said pipes being tapered on its inner side to the end thereof, said third workpiece comprising a sleeve, the said sleeve having a portion intermediate said end portions, and an annular groove in said intermediate portion whereby to receive the metal from the tapered end of one or more of said pipes.

BROR ANDERSON.
HANS WÄNGSJÖ.